US006928516B2

(12) United States Patent
Reuter

(10) Patent No.: US 6,928,516 B2
(45) Date of Patent: Aug. 9, 2005

(54) IMAGE DATA PROCESSING SYSTEM AND METHOD WITH IMAGE DATA ORGANIZATION INTO TILE CACHE MEMORY

(75) Inventor: Fred J. Reuter, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 199 days.

(21) Appl. No.: 09/998,782

(22) Filed: Dec. 3, 2001

(65) Prior Publication Data

US 2002/0083266 A1 Jun. 27, 2002

Related U.S. Application Data

(60) Provisional application No. 60/257,886, filed on Dec. 22, 2000.

(51) Int. Cl.$^7$ .............................................. G06F 12/00
(52) U.S. Cl. ...................................... 711/118; 345/557
(58) Field of Search .......................... 711/118; 345/557

(56) References Cited

U.S. PATENT DOCUMENTS

| | | | | |
|---|---|---|---|---|
| 5,293,481 A | | 3/1994 | Mita et al. ................... | 345/505 |
| 5,295,245 A | * | 3/1994 | Alcorn et al. ................ | 345/557 |
| 5,602,984 A | * | 2/1997 | Mieras ........................ | 345/557 |
| 6,233,647 B1 | * | 5/2001 | Bentz et al. ................... | 711/3 |
| 6,618,053 B1 | * | 9/2003 | Tanner ........................ | 345/552 |
| 6,674,443 B1 | * | 1/2004 | Chowdhuri et al. ........ | 345/557 |

FOREIGN PATENT DOCUMENTS

| EP | 0 536 414 A | 4/1993 |
|---|---|---|
| WO | WO 00 30034 A | 5/2000 |

OTHER PUBLICATIONS

Philippe Lacroute, Analysis of a Parallel Volume Rendering System Based on the Shear–Warp Factorization, IEEE Transactions on Visualization and Computer Graphics, IEEE Svc. Ctr., Piscataway, NJ, vol. 2, No. 3, Sep., 1, 1996, pp. 218–231.

* cited by examiner

Primary Examiner—Christian P. Chace
(74) Attorney, Agent, or Firm—Robert D. Marshall, Jr.; W. James Brady, III; Frederick J. Telecky, Jr.

(57) ABSTRACT

An image data processing system and method are disclosed in which image data is organized for fast and efficient transfer of image data to and from an image memory using a tile cache. Image data is stored in a memory having data words of a predetermined data width. Each data word includes a plural adjacently disposed image pixels of a single scan line. A set of consecutive data words corresponds to a two dimensional tile of the image whereby adjacent data words store image pixels of adjacent scan lines. The image data is transferred to a tile cache in these tiles. Following image processing on a tile of image data stored in the tile cache, the tile of image data is transferred back to the memory. The technique repeats for each tile of image data. Separate tiles of image data may be operated on by different data processors simultaneously.

9 Claims, 1 Drawing Sheet

IMAGE DATA PROCESSING SYSTEM AND METHOD WITH IMAGE DATA ORGANIZATION INTO TILE CACHE MEMORY

This application claims priority under 35 USC §119(e)(1) of Provisional Application No. 60/257,886, filed Dec. 22, 2000.

TECHNICAL FIELD OF THE INVENTION

The technical field of this invention is a method of manipulating and processing display element data for scanned printer image buffers.

BACKGROUND OF THE INVENTION

Printer page description languages (PDL), such as Postscript (a trademark of Adobe Systems Incorporated), use opaque image build up techniques to create the print page image. As new subimages are added to the image, the new subimage is written over the previous image within the boundary of the new subimage. These subimages are two dimensional regions which are mapped into memory space and stored until the image creation is complete. This requires an image memory which is either addressable on display element boundaries or a memory which can be read, modified, and rewritten. The former requires image processors with narrow data bus widths which are not conducive to high speed data transfers. The latter allows for high speed transfers but requires transfer of data which may not need to be modified.

These images consist of relatively few bits per display element but high performance processors necessary to process this type of image typically have data busses with widths which are several times wider than the number of bits in a display element.

SUMMARY OF THE INVENTION

This invention is directed to a technique of image data processing. Image data is stored in a memory having data words of a predetermined data width. Each data word includes plural adjacently disposed image pixels of a single scan line. A set of consecutive data words corresponds to a two dimensional tile of the image whereby adjacent data words store image pixels of adjacent scan lines. The image data is transferred to a cache in these tiles. Following image processing on a tile of image data stored in the cache, the tile of image data is transferred back to the memory. The technique repeats for each tile of image data. Separate tiles of image data may be operated on by different data processors simultaneously.

BRIEF DESCRIPTION OF THE DRAWINGS

These and other aspects of this invention are illustrated in the drawings, in which.

DETAILED DESCRIPTION OF PREFERRED EMBODIMENTS

The problem addressed by this invention is how to organize an image memory for fast and efficient transfer of image data from a processor to the image memory for read, modify, write applications. In this invention, a processor with a wide data bus can cache several words of data and organize the image memory in square tiles of display elements. This processor can cache small tiles of image memory, perform the intensive bit manipulations necessary and store the tile of display elements back to the image memory.

Assume the following processor attributes in an example describing the invention. The processor data bus width is 64 bits. The processor is byte addressable, capable of addressing data elements of a size of 8 bits. The display element size is 4 bits. The pixel tile size is 16 by 16 display elements.

Figure 1:
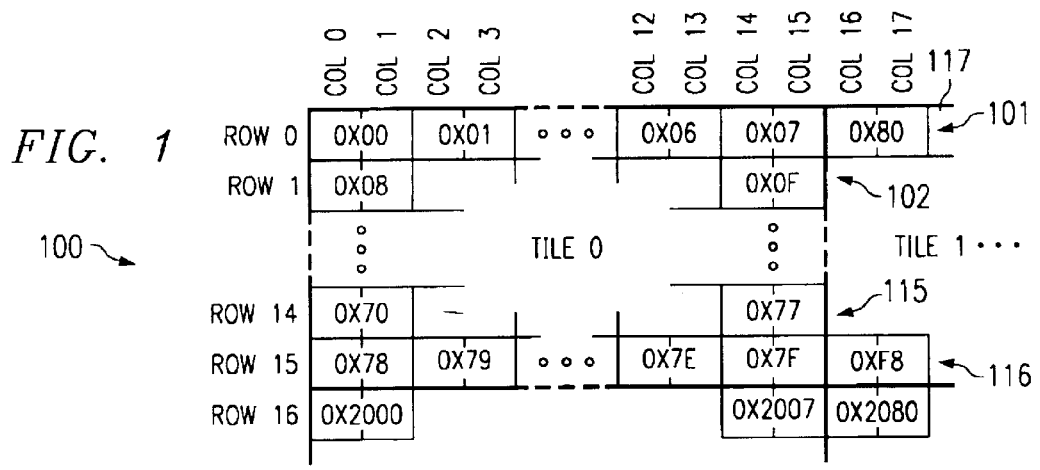
FIG. 1 illustrates image data organization in the memory of this invention.

FIG. 1 illustrates image data organization in the memory 100 of this invention. For efficiency of memory space, display element data is packed into memory 100 as 16 pixels per long word of 64 data bits. The memory 100 is organized with 16 long words per tile starting on modulo 128 address boundaries in the image display memory. The 64 bits in the first long word 101 in Tile 0 represent 16 adjacent pixels. The following long word 102 represents 16 pixels in the next line of pixels directly below the pixels in the first long word. This sequence continues until 16 long words of pixel data has been defined ending with the 16 pixels of the sixteenth long word 116. The seventeenth long word 117, the first long word of the next tile, Tile 1, represents the 16 pixels adjacent in the same line from the first long word in the tile, Tile 0. This sequence continues until the far side of the image is included, then the sequence of tiles restarts 16 rows below the previous sequence of tiles. Note in FIG. 1, the numbers within the boxes are the offset byte addresses from the beginning of the image in Hexadecimal.

Prior systems use processors without data caches. These processors must utilize the data bus for the entire read, modify, write cycle for every display element manipulation. These prior systems organized the memory as one-dimensional arrays of pixels, thus requiring additional accesses to perform associative operations in the second dimension.

This invention enables the processor to make relatively few memory bus accesses, in this example 16, in order to load a two dimensional array of display elements. This array can be operated upon from within the processor's cache and then returned to the image memory with only a few additional memory bus accesses. This reduces the time and overhead associated with accessing the image memory bus for each operation on each pixel element.

This solution reduces the amount of image memory bus activity associated with display element processing allowing more processors to have access to the image memory to operate on different areas of the image memory at the same time. This will enable higher performance display processing without the need to increase memory speed or memory bus bandwidth.

Figure 2:
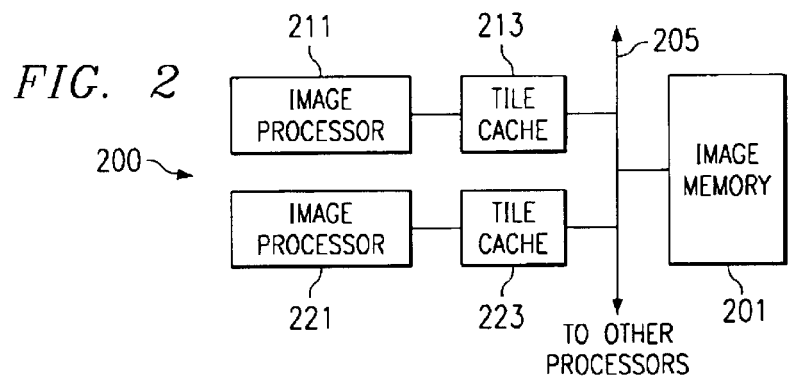
FIG. 2 illustrates in block diagram form an image data processor implementing this invention.

FIG. 2 illustrates in block diagram form an image data processor 200 implementing this invention. Image data processor 200 includes image memory 201 storing the image to be processed. This image memory 201 has a pixel organization such as illustrated in FIG. 1. Image data processor system 200 also includes one or more image processors 211 and 221. Each image processor 211 and 221 has a corresponding tile cache 213 and 223. The respective tile caches 213 and 223 are also connected to image processor system bus 205. Image processor system bus 205 is also connected to image memory 201 and may be connected to other image processor and tile cache combinations.

The primary advantage of using this technique of memory organization is reduction in the number and duration of accesses to image memory 210. This reduced memory traffic permits multiple processors, such as image processors 211 and 221, to work on image generation in parallel.

For the sake of comparison, assume that a typical page of text is approximately 10% dense, that is, 1 in 10 display elements are part of the text strokes used to make the image. Using the prior art memory organization, access to display elements in one direction of the two dimensional array can be accomplished within a DRAM row, page mode access. However, display element access in the other direction must be random for images of any substantial size. Accesses within a DRAM (dynamic random access memory) row may be accomplished using page mode techniques which result in access times on the order of 50 nanoseconds per access, whereas non-page mode accesses, page miss accesses, require access times on the order of 150 nanoseconds. According to this prior art memory organization, randomly accessing 10% of 256 display elements at a time would require about 25.6 accesses or 3840 nanoseconds for write only operations.

Using the memory organization of this invention, the memory accesses are not random but sequential. Thus page mode DRAM accesses may be used. Page mode DRAM accesses are on the order of 50 nanoseconds per access. To access 256 display elements in the tiled organization to load and writeback the tile cache requires 32 accesses, 16 reads and 16 writes. This requires only 1600 nanoseconds. This is a significant improvement over the 3840 nanoseconds required by the prior art memory organization. This invention requires 1600/3840 or 42% of the memory access time of conventional linear organized memory.

Figure 3:
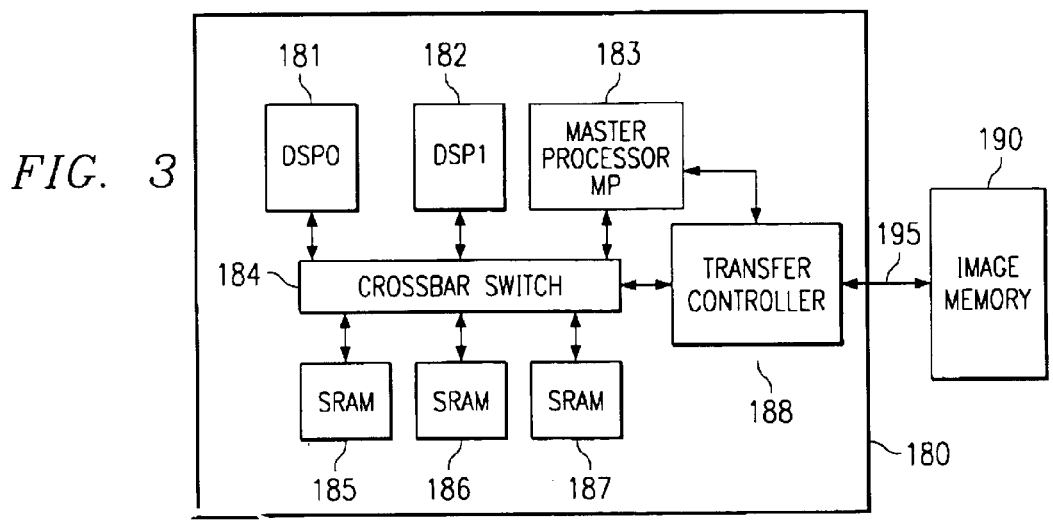
FIG. 3 shows a block diagram of the TM5320C82 DSP (digital signal processor) in an image data processing system according to this invention.

FIG. 3 illustrates a block diagram of a TMS320C82 digital signal processor (DSP) in an image data processing system according to this invention. The tiled memory organization shown can be very efficiently implemented on a multiprocessor DSP such as the Texas Instruments TMS320C82. The basic architecture of this DSP is shown on FIG. 3.

The multiprocessor DSP is a single integrated circuit 180. Integrated circuit 180 is a fully programmable parallel processing platform that integrates two advanced DSP cores DSP 181 and DSP 182, a reduced instruction set computer (RISC) master processor (MP) 183, multiple static random access memory (SRAM) blocks 185, 186 and 187, a crossbar switch 184 that interconnects all the internal processors and memories, and a transfer controller (TC) 188 that controls external communications. Transfer controller 188 is coupled to image memory 190 via bus 195. Note that transfer controller 188 controls all data transfer between integrated circuit 180 and image memory 190. Image data is stored in image memory 190 in tiles as illustrated in FIG. 1.

In operation, the individual DSPs 181 and 182 operate independently on separate tiles. Each DSP 181 and 182 signals transfer controller 188 to transfer a tile of data from image memory 190 to the corresponding SRAM (static random access 185 and 186. The DSPs 181 and 182 perform a programmed image transformation function on the tile data within the corresponding SRAMs 185 and 186. Access by DSPs 181 and 182 and master processor 183 to SRAMs 185, 186 and 187 is mediated by crossbar switch 184. When complete, the DSPs 181 and 182 signal transfer controller 188 to transfer data back to image memory 190 for storage in the memory location allocated to the corresponding tile. This technique greatly reduces the memory transfer requirements of image memory 190. Master processor 183 is preferably programmed for high level functions such as communication with other parts not shown.

What is claimed is:

1. A method of image data processing comprising the steps of:
   dividing an image into a plurality of two dimensional tiles, each tile composed of a first predetermined number of a plurality of pixels adjacently disposed in each scan line of a second predetermined number of a plurality of adjacent scan lines;
   storing image data in tiles in a memory having data words of a predetermined data width, each data word including said first predetermined number of a plurality of pixels adjacently disposed in a single scan line, a set of said second predetermined number of consecutive data words corresponding to a two dimensional tile of the image whereby adjacent data words include pixels of adjacent scan lines, and whereby each tile is stored in said second predetermined number of adjacent data words;
   transferring a tile of image data from the memory to a cache;
   performing image operations upon said tile of image data transferred to the cache; and
   transferring said tile of image data from the cache to the memory.

2. The method of claim 1, wherein:
   said steps of transferring a tile of image data from the memory into the cache, performing image operations upon said tile of image data transferred to the cache, and transferring said tile of image data from the cache to the memory are repeated for each tile of image data.

3. The method of claim 1, wherein:
   said steps of transferring a tile of image data from the memory into the cache, performing image operations upon said tile of image data transferred to the cache, and transferring said tile of image data from the cache to the memory are performed by different data processors for different tiles.

4. The method of claim 1, wherein:
   said image operations includes read, modify and write of individual pixels within a data word.

5. An image data processing system comprising:
   a memory storing image data in a plurality of two dimensional tiles, each tile composed of a first predetermined number of pixels adjacently disposed in each scan line of a second predetermined number of adjacent scan lines, said memory having data words of a predetermined data width, each data word including a first predetermined number of a plurality of pixels adjacently disposed on a single scan line, a set of a second predetermined number of consecutive data words corresponding to a two dimensional tile of said first predetermined number of pixels and said second predetermined number of scan lines of an image whereby adjacent data words include pixels of adjacent scan lines, and whereby each tile is stored in said second predetermined number of adjacent data words;
   a tile cache capable of storing a tile of image data from said memory;
   a data processing apparatus connected to said memory and said tile cache, said data processing apparatus programmed to
      transfer a tile of image data from said memory into said tile cache, perform an image operation upon said tile of image data transferred to said tile cache, and transfer that tile of image data from said tile cache to said memory.

6. The image data processing system of claim 5, wherein:

said data processing apparatus is further programmed to sequentially operate upon different tiles of Image data.

7. The image data processing system of claim 5, further comprising:

a second tile cache capable of storing a tile of image data from said memory;

a second data processing apparatus connected to said memory and said second tile cache, said second data processing apparatus programmed to transfer a tile of image data from said memory to said second tile cache, perform an image operation upon said tile of image data transferred to said second tile cache, and transfer that tile of image data from said second tile cache to said memory; and wherein said data processing apparatus and said second data processing apparatus are programmed to operate upon different tiles of image data simultaneously.

8. The method of claim 1, wherein:

said step of storing image data in tiles in a memory stores said second predetermined number of adjacent data words in a single page of a dynamic random access memory (DRAM);

said step of transferring a tile of image data from the memory to a cache includes making said second predetermined number of page mode dynamic random access memory (DRAM) accesses; and said step of transferring said tile of image data from the cache to the memory includes making said second predetermined number of page mode DRAM accesses.

9. The image data processing system of claim 5, wherein:

said memory includes a DRAM supporting page mode accesses and said second predetermined number of adjacent data words of each tile are stored in a single page; and said data processing apparatus is further programmed to transfer a tile of image data from said memory into said tile cache via said second predetermined number of page mode dynamic random access memory (DRAM) accesses, and transfer that tile of image data from said tile cache to said memory via said second predetermined number of page mode DRAM accesses.

* * * * *